United States Patent Office 2,921,068
Patented Jan. 12, 1960

2,921,068

MERCURATED 1,6-DIAZABICYCLO[4,4,0] DECANE-7,10-DIONES

Robert L. Clarke, Bethlehem Township, and Franklyn W. Gubitz, Nassau Township, N.Y., assignors to Sterling Drug Inc., New York, N.Y., a corporation of Delaware No Drawing. Application November 19, 1957
Serial No. 697,332

9 Claims. (Cl. 260—242)

This invention relates to mercury derivatives of 1,6-diazabicyclo[4,4,0]decane-7,10-dione and to processes for preparing them. More particularly, the invention relates to 3-R-Hg-4-R'O-1,6-diazabicyclo[4,4,0]decane-7,10-diones wherein R is an anion and R' is a lower aliphatic radical.

A preferred aspect of the invention relates to compounds having the formula

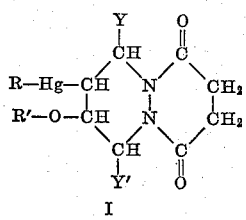

I wherein R is an anion, R' is hydrogen or a lower-alkyl, hydroxy-loweralkyl, lower-alkoxy-lower-alkly or a hydroxy-lower-alkoxy-lower-alkyl group, and Y and Y' are hydrogen or lower-alkyl groups.

Pharmacological evaluation of the compounds of the invention has demonstrated that these substances possess diuretic activity when administered to dogs at non-toxic and non-irritating dose levels, thus indicating their usefulness in relieving edematous conditions and in treatment of certain types of nephritis and heart disease wherein increased elimination of fluid and of sodium ion is desirable. The compounds can be administered intramuscularly, subcutaneously or orally, either per se or in combination with other diuretic substances such as theophylline. For parenteral use, the compounds are used in the form of an aqueous solution or suspension. For oral use, the compounds can be combined with conventional excipients and administered in tablet or capsule form.

In the above general Formula I, R represents an anion. Thus R can be the hydroxyl anion or an anion derived from a substance RH wherein H is an acidic hydrogen, including inorganic acids, organic carboxylic acids and sulfonic acids, phenols, mercaptans, and acidic nitrogen compounds, such as succinimide, phthalimide, theophylline and the like. A preferred class of anions is selected from non-toxic inorganic anions, lower alkanayloxy groups and lower-alkylmercapto groups, and said lower-alkanoyloxy and alkylmercapto groups substituted by groups selected from hydroxy, carboxy, carboalkoxy and amino. The lower-alkanoyloxy and lower alkylmercapto groups can be straight or branched and contain from 1 to about 6 carbon atoms. Thus the group R includes such groups as hydroxyl, halide (including chloride, bromide and iodide), nitrate, sulfate, thiosulfate, phosphate, acetoxy, propionoxy, butyroxy, methylmercapto, carboxymethyl-mercapto, carbethoxymethyl-mercapto, 2-hydroxyethyl-mercapto, aminoethylmercapto, propylmercapto, isopropylmercapto, 2-amino-3-carboxypropylmercapto, hydroxyacetoxy and the like.

The group R' in the above general Formula I represents hydrogen or the residue of a lower-alkanol, glycol or hydroxy ether. R' thus stands for hydrogen, lower-alkyl, hydroxy-lower-alkyl, lower-alkoxy-lower-alkyl, or hydroxy-lower-alkoxy-lower-alkyl. The groups can be straight or branched and contain from 1 to about 6 carbon atoms, thus including such groups as methyl, ethyl, propyl, isopropyl, butyl, isobutyl, pentyl, hexyl, isohexyl, 2-hydroxyethyl, 3-hydroxypropyl, 2-ethoxyethyl, 2-propoxyethyl, 2-(2-hydroxyethoxy)ethyl, and the like.

In the above general Formula I, the groups Y and Y' represent hydrogen atoms or lower-alkyl groups. The groups Y and Y' can be the same or different, although it is preferred that they be the same in order to prevent the formation of mixtures upon mercuration of the unsaturated intermediates of Formula II below. When Y and/or Y' are lower-alkyl groups they can be straight or branched and have from one to about four carbon atoms, thus including such groups as methyl, ethyl, propyl, isopropyl, butyl, isobutyl and tertiary-butyl.

The compounds of Formula I are prepared by reacting a compound having the formula

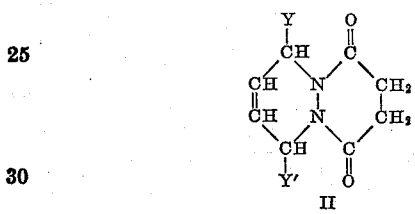

II wherein Y and Y' have the meanings given above, with a mercuric salt and a member of the group consisting of water, lower-alkanols, hydroxy-lower-alkanols, lower-alkoxy-lower-alkanols, and hydroxy-lower-alkoxy-lower-alkanols, said mercuric salt being at least partially soluble in the reaction medium. In the compounds of Formula I thus produced, the group R is the anion derived from the mercuric salt used, and the group R' is derived from the solvent used, being hydrogen if water is used or an aliphatic group if an alcohol is used. A preferred mercuric salt is mercuric acetate and a preferred solvent is methanol, thus giving the compounds of Formula I wherein R is acetoxy and R' is methyl. Under preferred conditions the reaction is carried out at a temperature between about 20° C. and 150° C. The reaction is completed within the course of a few hours if a trace of an oxidizing agent, such as nitric acid, hydrogen peroxide or an organic peroxide, is added as a catalyst, although the reaction occurs without the catalyst if the reactants are heated together for a more extended period of time.

The compounds of Formula I wherein R is hydroxyl are prepared by hydrolysis of the compounds where R is an anion derived from an acid RH, for example, acetoxy, preferably in the presence of an alkali metal hydroxide. The compounds wherein R is hydroxyl then can be reacted, if desired, with any acid RH to introduce any desired anion.

Alternatively, it is often possible to change one anion R to another by double decomposition reactions, provided the proper solubility relationships are present. For example, a compound of Formula I wherein R is acetoxy is relatively water and alcohol soluble and can be reacted with an alkali metal halide in aqueous or aqueous-alcoholic solution to give the corresponding compound of Formula I wherein R is halogen, which compound is relatively insoluble in water and alcohol and precipitates from solution.

In the reaction of a compound of Formula I wherein R is hydroxyl with a compound RH, wherein the hydrogen depicted is acidic in character, to replace the hydroxyl group by the anion R, it is desirable to neutralize any acidic groups present in the reactants other than the acidic group which is to be reacted with the hydroxyl group, in order to prevent side reactions and the formation of mixtures. For example, in the reaction of 3-hydroxymercuri-4-methoxy-1,6-diazabicyclo[4,4,0]decane - 7,10-dione [I; R=OH, R'=CH₃, Y and Y'=H] with thiomalic acid [HOOCCH₂CH(COOH)SH], two molar equivalents of sodium hydroxide are added to neutralize the two carboxyl groups of the thiomalic acid. The sulfhydryl group is left free to react with the hydroxyl group to give 3-(1,2-dicarboxyethylthiomercuri)-4-methoxy-1,6-diazabicyclo[4,4,0]decane-7,10-dione

[I;R=HOOCCH₂CH(COOH)S, R'=CH₃, Y and Y'=H]

in the form of its disodium salt.

The compounds of Formula II, which serve as intermediates in the preparation of compounds I, are prepared according to the following equations:

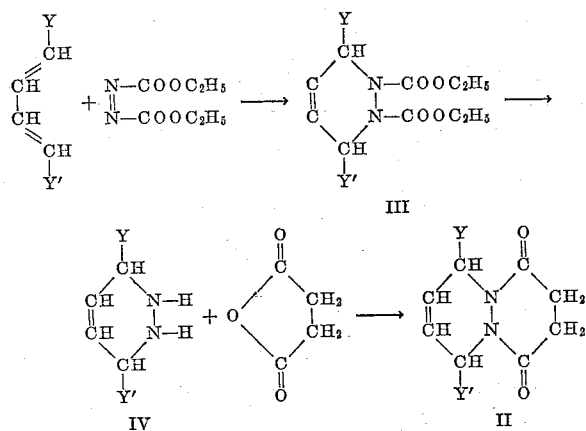

An alkadiene having conjugated double bonds is reacted with ethyl azodicarboxylate to give a 1,2-dicarbethoxy-1,2,3,6-tetrahydropyridazine (III). Among the alkadienes which can be employed are 1,3-butadiene, 1,3-pentadiene, 2,4-hexadiene, 3,5-octadiene, 2,7-dimethyl-3,5-octadiene, 5,7-dodecadiene, and the like. Hydrolysis of the compound of Formula III gives a 1,2,3,6-tetrahydropyridazine of the Formula IV which when reacted with succinic anhydride gives the compound of Formula II. The structure of the compound of Formula II was established by the method of preparation, by chemical analysis and by infrared data. The 1,2-dicarbethoxy-1,2,3,6-tetrahydropyridazines (III) and the 1,2,3,6-tetrahydropyridazines (IV) wherein Y and Y'= H, Y and Y'=CH₃ and Y=H; Y'=CH₃ are disclosed by Baranger et al., Compt. rend. 236, 1365 (1953).

Illustrative of the compounds of Formula II are 1,6-diazabicyclo[4,4,0]-3-decene-7,10-dione; 1,6-diazabicyclo[4,4,0]-2,5-dimethyl - 3 - decene-7,10-dione; 1,6-diazabicyclo[4,4,0]-2,5-diethyl-3-decene-7,10-dione; 1,6-diazabicyclo[4,4,0] - 2,5-dipropyl-3-decene-7,10-dione; 1,6-diazabicyclo[4,4,0] - 2,5-diisopropyl-3-decene-7,10-dione; 1,6-diazabicyclo[4,4,0]-2,5-dibutyl-3-decene-7,10 - dione and the like.

The compounds of Formula I which are acidic in character, i.e., those in which R contains acidic groupings such as carboxyl, sulfo and the like can be prepared and used either as the free acid or in the form of salts derived from bases whose cations are relatively innocuous to animal organisms in pharmacological doses of the salts and these salts are within the purview of the invention. Preferred salts are those whose cations are alkali metal ions, ammonium or substituted ammonium ions, e.g., sodium, potassium, ammonium, diethylammonium, diethanolammonium and the like.

The following examples will further illustrate the invention; without the latter being limited thereto.

EXAMPLE 1

(a) *1,2-dicarbethoxy-1,2,3,6-tetrahydropyridazine* [III; Y and Y'=H]

A slurry of 1496 g. (8.5 moles) of ethyl hydrazodicarboxylate in 5 liters of benzene and 5 liters of water was prepared and cooled to 10° C. Chlorine gas was then bubbled into the mixture until an excess had been taken up. The water layer was separated and the benzene layer washed twice with water, then with dilute aqueous sodium bicarbonate solution until there was no further effervescence, once more with water and then dried over anhydrous sodium sulfate and filtered.

The solution of ethyl azodicarboxylic thus prepared was used as such without isolation of the intermediate product. The solution was treated with butadiene until the color of the solution changed from a deep orange to near colorless. The benzene was removed by distillation and the residual oily product fractionally distilled under reduced pressure to give 1629 g. of 1,2-dicarbethoxy-1,2,3,6-tetrahydropyridazine; B.P. 111°–115° at 0.3 mm.

Other 1,2 - dicarbethoxy-1,2,3,6-tetrahydropyridazines can be produced by repeating the above preparation, observing the same conditions for conducting the process, by substituting a molar equivalent amount of a $C_5$ to $C_{12}$ alkadiene for the butadiene used therein. Thus, 1,2-dicarbethoxy-3,6-dimethyl-1,2,3,6-tetrahydropyridazine can be obtained with 2,4-hexadiene, by way of illustration.

(b) *1,2,3,6-tetrahydropyridazine* [IV; Y and Y'=H]

A solution of 252.5 g. (4.5 moles) of potassium hydroxide in 2 liters of absolute alcohol was prepared by warming. 1,2-dicarbethoxy-1,2,3,6-tetrahydropyridazine (228.3 g.; 1.0 mole) was then added dropwise with stirring at such a rate that the reaction refluxed gently. The mixture was stirred and heated under reflux for three hours and then allowed to stand at room temperature for forty-eight hours. The potassium carbonate that separated was removed by filtration and the bulk of the alcohol in the filtrate distilled off under vacuum. Absolute ether (500 ml.) was added to the mixture, insoluble solid material was again removed by filtration and the solvent distilled off from the filtrate. The residual red oil was fractionally distilled to give 39.5 g. of 1,2,3,6-tetrahydropyridazine as a clear liquid; B.P. 166–169; $n_D^{25}$, 1.5108.

By replacement in the above procedure of the 1,2-dicarbethoxy - 1,2,3,6 - tetrahydropyridazine by a molar equivalent amount of 1,2-dicarbethoxy-3,6-dimethyl-1,2,3,6-tetrahydropyridazine, there can be obtained 3,6-dimethyl-1,2,3,6-tetrahydropyridazine.

(c) *1,6-diazabicyclo[4,4,0]-3-decene-7,10-dione* [II; Y and Y'=H]

Ten grams (0.1 mole) of succinic anhydride were added to 8.4 g. (0.1 mole) of 1,2,3,6-tetrahydropyridazine in a small flask. A strongly exothermic reaction commenced, and the temperature of the mixture rose rapidly to 130° C. The reaction was brought under control by external cooling and then heated in a metal bath to 250°–260° C. until boiling ceased. The reaction mixture solidified on cooling and after four recrystallizations from ethanol afforded 6.1 g. of 1,6-diazabicyclo[4,4,0]-3-decene-7,10-dione; M.P. 183.9°–200.1° (corr.). The infrared spectrum taken as a potassium bromide pellet showed a strong band at 6.04 μ indicative of a tertiary amide group.

*Analysis.*—Calcd. for $C_8H_{10}N_2O_2$: C, 57.82; H, 6.07; N, 16.86. Found: C, 57.80; H, 6.14; N, 16.84.

By replacement in the above procedure of 1,2,3-6-tetrahydropyridazine with a molar equivalent amount of 3,6-dimethyl-1,2,3,6-tetrahydropyridazine, there can be obtained 1,6-diazabicyclo[4,4,0]-2,5-dimethyl-3-decene-7,10-dione [II; Y and Y'=CH₃].

EXAMPLE 2

*3-acetoxymercuri-4-methoxy-1,6-diazabicyclo[4,4,0]decane-7,10-dione [I; R=CH₃COO, R'=CH₃, Y and Y'=]*

To a solution of 3.84 g. (.023 mole) of 1,6-diazabicyclo[4,4,0]-3-decene-7,10-dione in 75 ml. of hot methanol was added a filtered solution of 7.37 g. (.023 mole) of mercuric acetate in 75 ml. of hot methanol containing three drops of concentrated nitric acid. The resulting mixture was stirred and refluxed for three hours and then cooled in ice. The solid product which separated was collected by filtration and recrystallized from ethanol to give 7.3 g. of 3-acetoxymercuri-4-methoxy-1,6-diazabicyclo[4,4,0]decane-7,10-dione; M.P. 192°–195° (uncorr.); softens 198.2°, melts indefinitely with decomposition (corr.).

3-acetoxymercuri-4-methoxy-1,6-diazabicyclo[4,4,0]decane-7,10-dione was found to possess diuretic activity greater than or equal to that of mersalyl free acid when administered intravenously to dogs at dose levels of 0.5–1.0 mg. Hg/kg. of body weight. No toxic manifestations were noted at dose levels up to 2.0 mg Hg/kg.

By replacing in the above procedure the 1,6-diazabicyclo[4,4,0]-3-decene-7,10-dione with a molar equivalent amount of 2,5-dimethyl-1,6-diazabicyclo[4,4,0]-3-decene-7,10-dione, there can be obtained 3-acetoxymercuri-2,5-dimethyl-4-methoxy-1,6-diazabicyclo[4,4,0]decane-7,10-dione.

By replacing in the procedure just described the methanol by water, ethanol, isopropanol, butanol, ethylene glycol, 2-ethoxyethanol, or diethylene glycol, and carrying out the reaction at a temperature between about 20° C. and 150° C. taking into account the boiling point of the medium, there can be obtained, respectively, 3-acetoxymercuri-4-hydroxy-1,6-diazabicyclo[4,4,0]decane-7,10-dione [I; R=CH₃COO, R'=H, Y and Y'=H], 3-acetoxymercuri-4-ethoxy-1,6-diazabicyclo[4,4,0]decane-7,10-dione [I; R=CH₃COO, R'=C₂H₅, Y and Y'=H], 3-acetoxymercuri-4-isopropoxy-1,6-diazabicyclo[4,4,0]decane-7,10-dione [I; R=CH₃COO,

Y and Y'=H], 3-acetoxymercuri-4-butoxy-1,6-diazabicyclo[4,4,0]decane-7,10-dione [I; R=CH₃COO, R'=nC₄H₉, Y and Y'=H], 3-acetoxymercuri-4-(2-hydroxyethoxy)-1,6-diazabicyclo[4,4,0]decane-7,10-dione [I; R=CH₃COO, R'=HOCH₂CH₂, Y and Y'=H], 3-acetoxymercuri-4-(2-ethoxyethoxy)-1,6-diazabicyclo[4,4,0]decane-7,10-dione [I; R=CH₃COO,

Y and Y'=H], 3-acetoxymercuri-4-[2-(2-hydroxyethoxy)ethoxy]-1,6-diazabicyclo[4,4,0]decane-7,10-dione [I; R=CH₃COO, R'=HOCH₂CH₂OCH₂CH₂, Y and Y'=H].

3-acetoxymercuri-4-methoxy-1,6-diazabicyclo[4,4,0]decane-7,10-dione can be treated with a molar equivalent amount of sodium hydroxide to give 3-hydroxymercuri-4-methoxy-1,6-diazabicyclo[4,4,0]decane-7,10-dione which on treatment with molar equivalent quantities of β-hydroxypropionic acid, carbethoxymethylmercaptan, serine, monosodium cysteinate, thiosorbitol or thioglyceral gives, respectively, 3-(β-hydroxypropionoxymercuri)-4-methoxy-1,6-diazabicyclo[4,4,0]decane-7,10-dione [I; R=HOCH₂CH₂COO, R=CH₃, Y and Y'=H]; 3-carbethoxymethylthiomercuri-4-methoxy-1,6-diazabicyclo[4,4,0]decane-7,10-dione

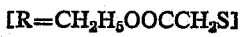

3-(α-amino-α-hydroxypropionoxymercuri)-4-methoxy-1,6-diazabicyclo[4,4,0]decane-7,10-dione

3-(2-amino-2-carboxyethylthiomercuri)-4-methoxy-1,6-diazabicyclo[4,4,0]decane-7,10-dione

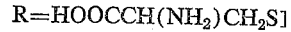

3-(2,3,4,5,6-pentahydroxyhexylthiomercuri)-4-methoxy-1,6-diazabicyclo[4,4,0]decane-7,10-dione

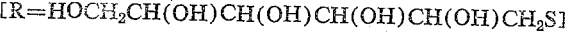

3-(2,3-dihydroxypropylthiomercuri)-4-methoxy-1,6-diazabicyclo[4,4,0]decane-7,10-dione

3-acetoxymercuri-4-methoxy-1,6-diazabicyclo[4,4,0]decane-7,10-dione in a methanol solution can be treated with molar equivalent quantities of sodium chloride, sodium bromide, sodium iodide or sodium thiosulfate in aqueous solutions to give, respectively, 3-chloromercuri-4-methoxy-1,6-diazabicyclo[4,4,0]decane-7,10-dione [I; R=Cl]; 3-bromomercuri-4-methoxy-1,6-diazabicyclo[4,4,0]decane-7,10-dione [R=Br]; 3-iodomercuri-4-methoxy-1,6-diazabicyclo[4,4,0]decane-7,10-dione [R=I]; 3-hydrothiosulfatomercuri-4-methoxy-1,6-diazabicyclo[4,4,0]decane-7,10-dione [R=NaSO₃—S].

We claim:

1. 3-R-Hg-4-R'O-1,6-diazabicyclo[4,4,0]decane-7,10-diones wherein R is a non-toxic anion and R' is a member of the group consisting of hydrogen, lower-alkyl, hydroxy-lower-alkyl, lower-alkoxy-lower-alkyl and hydroxy-lower-alkoxy-lower-alkyl groups.

2. 3-R-Hg-4-R'O-1,6-diazabicyclo[4,4,0]decane-7,10-diones wherein R is a non-toxic anion and R' is lower alkyl group.

3. 3-(lower-alkanoxyloxymercuri)-4-methoxy-1,6-diazabicyclo[4,4,0]decane-7,10-diones.

4. 3-acetoxymercuri-4-methoxy-1,6-diazabicyclo[4,4,0]decane-7,10-diones.

5. 1,6-diazabicyclo[4,4,0]-3-decene-7,10-diones.

6. A process for preparing a 3-R-Hg-4-R'O-1,6-diazabicyclo[4,4,0]decane-7,10-dione of claim 1 wherein R is a non-toxic anion and R' is a member of the group consisting of hydrogen, lower-alkyl, hydroxy-lower-alkyl, lower-alkoxy-lower-alkyl and hydroxy-lower-alkoxy-lower-alkyl groups, which comprises reacting a 1,6-diazabicyclo[4,4,0]-3-decene-7,10-dione with a mercuric salt and a member of the group consisting of water, lower-alkanols, hydroxy-lower-alkanols, lower-alkoxy-lower-alkanols and hydroxy-lower-alkoxy-lower-alkanols, said mercuric salt being at least partially soluble in the reacting medium.

7. The process according to claim 6 in which the mercuric salt is mercuric acetate thus producing a compound wherein R is acetoxy.

8. The process according to claim 6 in which the lower alkanol is methanol, thus producing a compound wherein R' is methyl.

9. A process for preparing a 1,6-diazabicyclo[4,4,0]-3-decene-7,10-dione of claim 5 which comprises reacting a 1,2,3,6-tetrahydropyridazine with succinic anhydride.

References Cited in the file of this patent

UNITED STATES PATENTS 2,813,867    Hunter _____ Nov. 19, 1957

OTHER REFERENCES

Baranger et al., Compt. Rend., vol. 236, pp. 1365–1367 (1953).

UNITED STATES PATENT OFFICE
CERTIFICATE OF CORRECTION

Patent No. 2,921,068            January 12, 1960

Robert L. Clarke et al.

It is hereby certified that error appears in the printed specification of the above numbered patent requiring correction and that the said Letters Patent should read as corrected below.

Column 1, line 34, for "-lower-alkly" read -- -lower-alkyl --; line 58, for "alkanayloxy" read -- alkanoyloxy --; column 3, lines 20 to 27, formula III should appear as shown below instead of as in the patent:

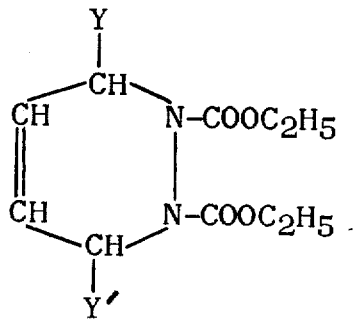

column 4, line 14, for "azodicarboxylic" read -- azodicarboxylate --; line 50, for "-tetrahydropyradazine" read -- -tetrahydropyridazine --; same column 4, line 71, for "1,2,3-6-" read -- 1,2,3,6- --; column 5, line 5, for "Y'=]" read -- Y'=H] --; line 72, the formula should appear as shown below instead of as in the patent:

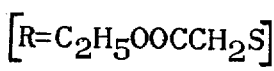

column 6, line 1, for "-α-hydroxypropionoxymercuri)-" read -- -β-hydroxypropionoxymercuri)- --; line 37, for "-alkanoxyloxymercuri)-" read -- -alkanoyloxymercuri)- --; same column 6, line 40, for ",10-diones." read -- ,10-dione. --.

Signed and sealed this 16th day of August 1960.

(SEAL)
Attest:

KARL H. AXLINE
Attesting Officer

ROBERT C. WATSON
Commissioner of Patents